United States Patent
Grossmann et al.

(10) Patent No.: US 12,438,583 B2
(45) Date of Patent: *Oct. 7, 2025

(54) METHODS AND APPARATUSES FOR REDUCING FEEDBACK OVERHEAD

(71) Applicant: KONINKLIJKE PHILIPS N.V., Eindhoven (NL)

(72) Inventors: Marcus Grossmann, Eindhoven (NL); Ramireddy Venkatesh, Eindhoven (NL); Markus Landmann, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,535

(22) Filed: May 29, 2024

(65) Prior Publication Data

US 2024/0313842 A1   Sep. 19, 2024

Related U.S. Application Data

(63) Continuation of application No. 17/551,711, filed on Dec. 15, 2021, now Pat. No. 12,021,591, which is a continuation of application No. 17/264,667, filed as application No. PCT/EP2018/081125 on Nov. 13, 2018, now Pat. No. 11,223,407.

(51) Int. Cl.
*H04B 7/02* (2018.01)
*H04B 7/0456* (2017.01)
*H04B 7/06* (2006.01)

(52) U.S. Cl.
CPC ......... *H04B 7/0626* (2013.01); *H04B 7/0456* (2013.01)

(58) Field of Classification Search
CPC ... H04B 7/0626; H04B 7/0456; H04B 7/0478
USPC .......................................................... 375/267
See application file for complete search history.

(56) References Cited

U.S. PATENT DOCUMENTS

| | | | | |
|---|---|---|---|---|
| 11,438,041 | B2* | 9/2022 | Gao | H04L 5/0048 |
| 2008/0298482 | A1* | 12/2008 | Rensburg | H04B 7/065 |
| | | | | 375/260 |
| 2015/0049824 | A1 | 2/2015 | Kim | |

OTHER PUBLICATIONS

Notification of Transmittal of The International Prelimnary Report on Patentability dated Septemer 4, 2020, received from the International Preliminary Examining Authority of the European Patent Office.

Fraunhofer IIS et al: "Enhancements on Type-II CSI Reporting", 3GPP Draft; R1-1811088, 3rd Generation Partnership Project (3GPP), Mobile Competence Center; 650, Route Des Lucioles; F-06921 Sophia-Antipolis Cedex; France, Ran WG1, Chengdu, China; Sep. 28, 2018.

(Continued)

*Primary Examiner* — Helene E Tayong

(57) ABSTRACT

The invention describes a method performed by a radio network node, a network node, a method performed by a UE and a UE for reducing s feedback overhead. The method performed by the UE is decomposing each entry corresponding to a combining coefficient of a precoder matrix into at least two coefficients and quantizing, separately, each of two coefficients with a least one bit, and reporting information related to a phase value or an amplitude value or at a phase value and an amplitude value of the quantized coefficient.

25 Claims, 5 Drawing Sheets

(56) References Cited

OTHER PUBLICATIONS

Motorola Mobility/Lenovo: "Type II CSI Overhead Reduction", 3GPP Draft; R1-1813357, 3rd Generation Partnership Project (3GPP), Mobile Competence Center; 650, Route Des Lucioles; F-06921 Sophia-Antipolis Cedex; France, RAN WG1, Spokane, China; Nov. 2018.

Huawei etal: "Discussion On CSI Enhancement", 3GPP Draft; R1-1812242,3rd Generation Partnership Project (3GPP), Mobile Competence Centre; 650, Route Des Lucioles; F-06921 Sophia-Antipolis Cedex; France, RAN WG1, Spokane, USA; Nov. 2018.

\* cited by examiner

METHODS AND APPARATUSES FOR REDUCING FEEDBACK OVERHEAD

CROSS-REFERENCE TO RELATED APPLICATION

This a continuation of national stage patent application Ser. No 17/551,711, filed on Dec. 15, 2021, which is a continuation of Ser. No. 17/264,667, filed Jan. 29, 2021, filed under 35 U.S.C. § 371, of International Patent Application No. PCT/EP2018/081125 filed on Nov. 13, 2018, which is incorporated by reference herein in their entirety.

TECHNICAL FIELD

The present disclosure relates to the field of wireless communications, and in particular to methods and apparatuses for reducing feedback overhead (e.g. CSI feedback) by employing efficient amplitude and phase quantization and reporting of coefficients in a communications network.

BACKGROUND

Beamforming is a crucial part of the third Generation Partnership Project (3GPP) Release (Rel.) 15 which define a New Radio (NR) access technology that enables a radio base station (also denote herein gNB) and a User Equipment (UE) to establish and adapt communication links using spatially precoded pilot signals. Important information in 5G to improve communication links and to efficiently adapt the beamforming technique is feedback reported by a gNB and/or a UE regarding Channel State Information or CSI feedback reporting.

In Rel.-15 Type-II CSI reporting, it is assumed that dual-stage precoding is performed in the frequency domain on a per subband basis, i.e., a single precoder is calculated for a group of adjacent Physical Resource Blocks (PRBs), referred to as a 'subband'. The Rel.-15 Type-II dual-stage precoder comprises two components: A first-stage precoder denoted $F_1$ that is identical for all subbands and which contains the selected entries/beams selected from a Discrete Fourier Transform-based codebook (DFT-based codebook), and a second stage precoder denoted $F_2$ which contains the subband-dependent beam-combining coefficients of all subbands.

The feedback overhead for reporting the beam-combining coefficients increases approximately linearly with the number of subbands, and it becomes considerably large for large numbers of subbands. To overcome the high feedback overhead of the Rel.-15 Type-II CSI reporting, it has been decided in 3GPP-Radio Access Network (RAN) standardization meeting, 3GPP RAN #81 [1] to study feedback compression schemes for the second stage precoder $F_2$. In several contributions [2]-[7], it has been demonstrated that the number of beam-combining coefficients in $F_2$ may be drastically reduced when transforming $F_2$ using a small set of DFT or Discrete Cosine Transform (DCT) basis vectors into the delay domain.

Rel.-15 Dual-Stage Precoding and CSI Reporting:

Assuming a rank-R transmission and a dual-polarized antenna array at the gNB with configuration $(N_1, N_2, 2)$, the Rel.-15 double-stage precoder disclosed in [8] for the s-th subband and r-th transmission layer is given by $$F^{(r)}(s) = F_1^{(r)} f_2^{(r)}(s), \qquad (1)$$
$$= F_1^{(r)} F_A \hat{f}_2^{(r)}(s)$$

where the precoder matrix $F^{(r)}(s)$ has $2N_1N_2$ rows corresponding to the number of ports, and S columns for the reporting subbands/PRBs. The matrix $F_1^{(r)} \in \mathbb{C}^{PN_1N_2 \times 2L}$ is the wideband first-stage precoder containing 2L spatial beams for both polarizations, which are identical for all S subbands, and $F_A$ is a diagonal matrix containing 2L wideband amplitudes associated with the 2L spatial beams, and $\hat{f}_2^{(r)}(s)$ is the second-stage precoder containing 2L subband (subband amplitude and phase) complex frequency-domain combining-coefficients associated with the 2L spatial beams for the s-th subband.

According to [8], the reporting and quantization of wideband amplitude matrix $F_A$ and subband combining coefficients in $\hat{f}_2^{(r)}(s)$ are quantized and reported as follows:

Quantization and Reporting of Wideband Amplitudes of Matrix $F_A$

The wideband amplitude corresponding to the strongest beam which has an amplitude value of 1 is not reported. The wideband amplitude values associated with the remaining 2L−1 beams are reported by quantizing each amplitude value with 3 bits.

Quantization and reporting of amplitude and phase values of subband precoder $\hat{f}_2^{(r)}(s)$:

The amplitudes and phase values of the coefficients associated with the first leading beam are not reported (they are assumed to be equal to 1 and 0).

For each subband, the amplitudes of the B coefficients associated with the first B−1 leading beams (other than the first leading beam) are quantized with 1 bit–[$\sqrt{0.5}$ 1].

The amplitude values of the remaining 2L−B beams are not reported (they are assumed to be equal to 1).

For each subband, the phase values of the B−1 coefficients associated with the first B−1 leading beams (other than the first leading beam) are quantized with 3 bits.

The phase values of the remaining 2L−B beams are quantized with 2 bits.

The number of leading beams for which the subband amplitude is reported is given by B=4, 4 or 6 when the total number of configured spatial beams L=2, 3, or 4, respectively.

Space-Delay Precoder:

Collecting the precoders $F^{(r)}(s)$ for all S subbands in a matrix $F^{(r)}$, we obtain [2, 3, 7]

$$F^{(r)} = F_1^{(r)} [f_2^{(r)}(0) \ldots f_2^{(r)}(s) \ldots f_2^{(r)}(S-1)], \qquad (2)$$
$$= F_1^{(r)} F_2^{(r)}.$$

Then the second-stage precoder $F_2^{(r)}$ can be written as: $F_2^{(r)} = [f_{2,1}^{(r)} \ldots f_{2,u}^{(r)} \ldots f_{2,2U}^{(r)}]^T$, whose u-th row contains the complex combining-coefficients associated with the u-th beam over S subbands, $$f_{2,u}^{(r)} = [f_{2,u}^{(r)}(0) \ldots f_{2,u}^{(r)}(s) \ldots f_{2,u}^{(r)}(S-1)]^T \in \mathbb{C}^{S \times 1}.$$

By considering a transformation on the subband precoder $F_2^{(r)}$, the overall precoder may be written as $$F^{(r)} = F_1^{(r)} W_2^{(r)} K_F^{(r)T}, \qquad (3)$$

where matrix $W_2^{(r)} \in \mathbb{C}^{2L \times V}$ contains the complex-combining coefficients and the matrix $K_F^{(r)} \in \mathbb{C}^{V \times S}$ is composed of a number of basis vectors used to perform a compression in the frequency domain. In general, when V<S a compression of the combining coefficients $F_2^{(r)}$ is achieved. Each complex coefficient in $W_2^{(r)}$ in (3) is associated with a specific delay (in the transformed domain) as each DFT/DCT basis vector models a linear phase increase over the subbands.

The number of spatial beams and indices of spatial beams may be different, identical, partially identical or non-identical over the transmission layers.

In addition, with respect to the spatial beams, the delays may be partially identical or non-identical over the beam. Due to different spatial beam configuration over the layers, the delay configuration may vary over the layers as well. Therefore, multiple configurations of the beam and delay configurations are possible. However, the spatial beam and delay configuration of the space-delay precoder shall be aligned with the physical structure of the radio channel. The radio channel is comprised of a number of clusters of scatterers associated with respective delays (see channel cluster #1, delay #1, . . . , channel cluster #3, delay #2 in FIG. 1).

In the example of FIG. 1, each transmit spatial beam of the gNB (beam #1, beam #2, beam #3 and beam #4 in this example) is associated with a single or few channel clusters with corresponding delays. Beam #1 is associated with cluster #1 and delay #1. Beam #2 and Beam #3 are associated with the direct Line Of Sight (LOS) channel component and with cluster #3 and delay #3. Beam #4 is associated with cluster #2 and delay #2. As shown, the delays of cluster #1 and cluster #2 are different and longer than the delay of cluster #3 (closest to the UE).

In order to capture a significant portion of the energy of the radio channel at the UE, the spatial DFT/DCT beams of the first stage precoder need to point in the direction of the channel clusters. In a typical channel setting the clusters are uniformly distributed around the gNB, and each transmit spatial beam is associated with a single or few neighbored clusters. Moreover, due to the uniform distribution of the channel clusters, each cluster is associated with a different delay. The number of clusters to which each spatial beam is associated with depends mainly on the beam width (which is related to the aperture size of the antenna array at the gNB). The larger the beam width (i.e., the smaller the aperture size of the antenna array) the more channel clusters are associated with the spatial beam. Therefore, the delay configuration (number of delays per beam and the values of the delays) of each spatial beam depends on the channel cluster(s) to which the spatial beam is associated with.

For the transformed precoder, each spatial beam is associated with either a single or a small set of delays. The transmit beams are hence "delayed" by specific delay(s) before transmission. The delays need to be selected in such a way that all 2L beams are coherently combined at the UE. Note again that each delay is represented by entries of a DFT/DCT vector which models a linear phase increase over the subbands.

The selection of the delays for a spatial beam is therefore identical to a selection of DFT/DCT vectors. Due to the delay distribution of the channel clusters, it should be understood that the delays associated with one spatial beam might be different to the delays associated with another spatial beam. Similarly, the delay configuration (number of delays and the delay values) may be different for different beams. Different delay configurations are discussed in detail in applicant's documents [2], [3], [7]. Note that document [7] has not yet been published when the present application is filed and hence [7] is not to be considered prior art for the subject matter of the claims and teachings of the present application.

When different DFT/DCT vectors are used per spatial beam, a matrix containing all selected DFT/DCT vectors of all configured spatial beams may be used to form a common matrix for the transformation. The common transformation matrix contains all the selected DFT/DCT vectors of all beams. When such a matrix is used for the transformation, the combining coefficients associated with a beam contain few non-zeros coefficients only for the DFT/DCT vectors it is associated with and zeros elsewhere. Therefore, the complex combining coefficients in matrix $W_2^{(r)}$ in (3) may contain a large number of values which are close to zero.

3GPP DRAFT; R-1812242, $3^{RD}$ GENERATION PARTNERSHIP PROJECT (3GPP), MOBILE COMPETENCE CENTER; 650, ROUTES DES LUCIOLES; F-06921 SOPHIA-ANTIPOLIS CEDEX; FRANCE, RAN WG1, Spokane, USA, November 2018, discloses discussion on CSI enhancement in Re-16.

3GPP DRAFT; R-1813357, $3^{RD}$ GENERATION PARTNERSHIP PROJECT (3GPP), MOBILE COMPETENCE CENTER; 650, ROUTES DES LUCIOLES; F-06921 SOPHIA-ANTIPOLIS CEDEX; FRANCE, RAN WG1, Spokane, China, November 2018, discloses discussion on type II CSI overhead reduction.

SUMMARY

An object of embodiments herein is to provide methods and apparatuses in the form a User Equipment (UE) and a radio base station or network node or gNB respectively for reducing (CSI) feedback overhead by employing efficient amplitude and phase quantization and reporting of coefficients in a communications network that employs beamforming and/or MIMO operation. Further, the present embodiments address the problem of how to efficiently quantize and report the transformed combining coefficients.

According to an aspect of embodiments herein, there is provided a method performed by a UE for reducing feedback overhead related to CSI in a communications network employing MIMO operation:
  decomposing each entry corresponding to a (i, j)-th combining coefficient of a precoder matrix $W_2^{(r)}$, into at least two coefficients, wherein r denotes a r-th transmission layer; said (i, j)-th combining coefficient is associated with a i-th beam and a j-th delay, and wherein each combining coefficient is associated with an amplitude and a phase-information;
  quantizing, separately, each of said at least two coefficients with a least one bit, and
  reporting information related to at least one phase value or at least one amplitude value or at least one phase value and an amplitude value of said quantized coefficient.

According to another aspect of embodiments herein, there is provided an apparatus in the form of UE for reducing feedback overhead in a communications network, the UE comprising a processor and a memory, said memory containing instructions executable by said processor whereby said UE is operative to perform any of the methods disclosed herein.

There is also provided a computer program comprising instructions which when executed on at least one processor of the UE cause the at least said one processor to carry out any of methods disclosed herein.

A carrier containing the computer program, wherein the carrier is one of a computer readable storage medium; an electronic signal, optical signal or a radio signal.

There is also provided a method performed by a radio network node gNB for reducing feedback overhead related to Channel State Information, CSI, in a communications network employing Multi Input Multi Output, MIMO operation, the method comprising: receiving, from a UE, a report including information related to at least one phase value or at least one amplitude value or at least one phase value and an amplitude value each quantized coefficient which is quantized with a least one bit by a UE;

wherein each entry corresponding to a (i, j)-th combining coefficient of a precoder matrix $W_2^{(r)}$, is decomposed by the UE into at least two coefficients, wherein r denotes a r-th transmission layer; said (i, j)-th combining coefficient is associated with a i-th beam and a j-th delay, and wherein each combining coefficient is associated with an amplitude and a phase-information;

According to another aspect of embodiments herein, there is also provided a radio network node or gNB for reducing feedback overhead in a communications network, the radio network node comprising a processor and a memory, said memory containing instructions executable by said processor whereby said the radio network node is operative to perform anyone of the methods disclosed herein.

There is also provided a computer program comprising instructions which when executed on at least one processor of the radio network node, cause the at least said one processor to carry out any of the methods disclosed herein.

A carrier is also provided containing the computer program wherein the carrier is one of a computer readable storage medium; an electronic signal, optical signal or a radio signal.

Several advantages with the embodiments herein are presented in the detailed part of this disclosure.

BRIEF DESCRIPTION OF THE DRAWINGS

Examples of embodiments and advantages of the embodiments herein are described in more detail with reference to attached drawings in which.

DETAILED DESCRIPTION

Figure 1:
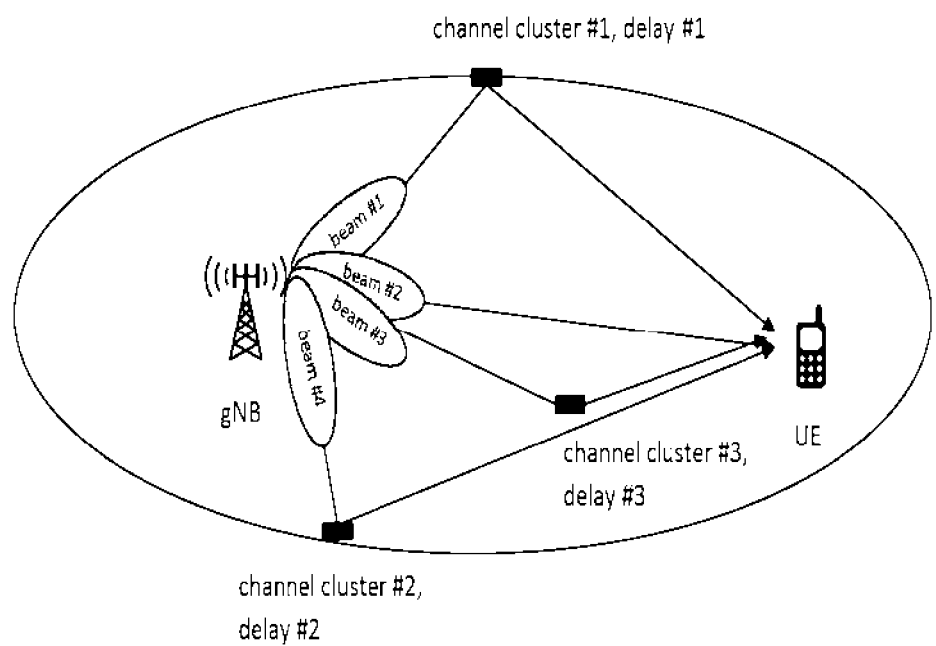
FIG. 1 depicts an example network scenario wherein embodiments herein may be employed.

In the following is presented a detailed description of the exemplary embodiments in conjunction with the drawings, in several scenarios, to enable easier understanding of the solution(s) described herein.

As previously described, in 3GPP new radio system, two types of codebook, namely Type-1 and Type-2 codebook, have been standardized for the CSI feedback in the support of advanced MIMO operation.

The present embodiments address the problem of how to efficiently quantize and report the transformed combining coefficients in order to reduce CSI feedback overhead in a communications network employing beamforming.

A. Quantization and Reporting of Complex Combining Coefficients of Matrix $W_2^{(r)}$:

$W_2^{(r)}$ which was previously presented in equation (3) and repeated below is the overall precoder which may be written as $$F^{(r)} = F_1^{(r)} W_2^{(r)} K_F^{(r)T}, \quad (3)$$

Each complex coefficient in $W_2^{(r)}$ in (3) is associated with a specific delay (in the transformed domain) as each DFT/DCT basis vector models a linear phase increase over the subbands. $W_2^{(r)}$ contains complex-combining coefficients. The values of $N_1$ and $N_2$ are design parameters and may be included in a configuration of an antenna array at a gNB, which antenna array may for example be dual-polarized, although the embodiments herein are not restricted to dual-polarized antenna arrays.

An approach for quantizing the amplitude and phase values of the coefficients in $W_2^{(r)}$, according to an exemplary embodiment, is to quantize directly each amplitude and phase value with $N_1$ and $N_2$ bits, respectively.

For example, assuming that matrix $W_2^{(r)}$ contains UD coefficients, then $UD(N_1+N_2)$ bits are required for reporting the amplitude and phase information of $W_2^{(r)}$ to the gNB. However, as mentioned previously, each of the U beams are typically associated with only a set of delays and not all D delays. Therefore, the matrix $W_2^{(r)}$ may be considered as a sparse matrix where a large number of the coefficients are close to zero.

In the following description, the matrix $W_2^{(r)} \in \mathbb{C}^{U \times D}$ in equation (3) may contain the complex combining coefficients associated with all (2L) spatial beams (i.e., U=2L), or only a subset of spatial beams (e.g., U<2L), and/or all (V) delays/basis vectors (i.e., D=V), or only a subset of delays/basis vectors (e.g., D<V).

1. Selection and Reporting of Non-Zero Coefficients by Using a Bitmap

In order to save feedback overhead for reporting a quantized version of $W_2^{(r)}$, an approach according to an exemplary embodiment is to feedback only the amplitude and phase-information of the non-zero coefficients of matrix $W_2^{(r)}$ and to indicate by a bitmap the indices of the reported coefficients. For example, the first bit in the bitmap may be associated with the first coefficient, the second bit with the first coefficient of matrix $W_2^{(r)}$ and so on. When a bit in the bitmap is set to '1' the corresponding coefficient (amplitude and/or phase) may be reported and otherwise not. In this way, the overhead for reporting the combining coefficients may be largely reduced; however, the number of feedback bits is not fixed and may vary for each reporting instance. (see below how he number of feedback bits may be fixed).

2. Selection and Reporting of K Strongest Coefficients

In order to fix the number of feedback bits for reporting the combining coefficients, the receiver may be configured to feedback the amplitude and/or phase values of the K strongest coefficients of matrix $W_2^{(r)}$, where the value of the parameter K is configurable by the gNB. The K strongest coefficients may be represented by the K entries having the highest amplitude (or power) over the elements in $W_2^{(r)}$. When a bit in the bitmap is set to '1', the UE may be configured to report the phase and/or amplitude values of the associated coefficient $b_{i,j}$ to the gNB. The bitmap may hence contain no more than K '1's.

In order to increase the flexibility of selecting the coefficients and to improve the system performance, the receiver (e.g. a UE or another gNB) may be configured to select $K_u$ strongest coefficients per row/beam out of matrix $W_2^{(r)}$, where the parameters $K_u$ may be configurable by the gNB (transmitter). Note that the values of $K_u$ may be identical for a set of rows/beams of matrix $W_2^{(r)}$. In such a case, a single parameter R may be used to configure multipole parameters $K_d$.

Similarly, the receiver may be configured to select $K_d$ strongest coefficients per column/delay out of matrix $W_2^{(r)}$, where the parameters $K_d$ may be configurable by the gNB. Note that the values of $K_d$ may also be identical for a set of columns/delays of matrix $W_2^{(r)}$. In such a case, a single parameter O is used to configure multiple parameters $K_d$.

3. Selection of Submatrices of $F_2^{(r)}$ for Reporting

According to an exemplary embodiment, to reduce the overhead for reporting the coefficients in $W_2^{(r)}$, the receiver may be configured to report only the amplitude and/or phase information for a subset of the coefficients in $W_2^{(r)}$. The subset of coefficients in $W_2^{(r)}$ may contain the combining coefficients associated with the "strongest" beams and/or "strongest" delays. In such a case, the rows and/or columns of $W_2^{(r)}$ may be assumed to be ordered in such a way that the combining-coefficients satisfy:

$$\sum_{\forall j} \left| [W_2^{(r)}]_{1,j} \right| \geq \sum_{\forall j} \left| [W_2^{(r)}]_{2,j} \right| \geq \ldots \geq \sum_{\forall j} \left| [W_2^{(r)}]_{U,j} \right|$$

and/or $$\sum_{\forall i} \left| [W_2^{(r)}]_{i,1} \right| \geq \sum_{\forall i} \left| [W_2^{(r)}]_{i,2} \right| \geq \ldots \geq \sum_{\forall i} \left| [W_2^{(r)}]_{i,D} \right|.$$

In an example, the receiver may be configured to report the amplitude and/or phase information of the coefficients associated with the U' "strongest" beams. The receiver may then report the amplitude and/or phase information of the coefficients: $\{[W_2^{(r)}]_{i,j}: i=1, \ldots, U', \forall j\}$.

In another example, the receiver maybe configured to report the amplitude and/or phase information of the coefficients associated with the D "strongest" delays. The receiver may report the amplitude and/or phase information of the coefficients: $\{[W_2^{(r)}]_{i,j}: j=1, \ldots, D', \forall i\}$.

In another example, the receiver may be configured to report the amplitude and/or phase information of the coefficients associated with the U' "strongest" beams and D "strongest" delays. The receiver may report the amplitude and/or phase information of the coefficients: $\{[W_2^{(r)}]_{i,j}: i=1, \ldots, U', j=1, \ldots, D'\}$.

In order to further significantly reduce the feedback overhead for reporting a quantized version of $W_2^{(r)}$, three decomposition and quantization schemes for $W_2^{(r)}$ are described according to some embodiments herein:

1. Scheme 1

The first scheme decomposes the (i,j)-th combining-coefficient of matrix $W_2^{(r)}$ associated with the i-th beam and j-th delay into two coefficients, $a_i$ and $b_{i,j}$, $$[W_2^{(r)}]_{i,j} = a_i b_{i,j},$$

where $b_{i,j}$ is the complex-valued normalized combining-coefficient associated with the i-th beam and j-th delay, and $a_i$ is a real-valued coefficient representing a common amplitude for the combining coefficients for all delays associated with the i-th beam. Note that the calculation of the values $a_i$ is implementation specific.

2. Scheme 2

The second scheme decomposes the (i,j)-th combining-coefficient of matrix $W_2^{(r)}$ associated with the i-th beam and j-th delay into two coefficients, $d_j$ and $b_{i,j}$, $$[W_2^{(r)}]_{i,j} = d_j b_{i,j},$$

where $b_{i,j}$ is the complex-valued normalized combining-coefficient associated with the i-th beam and j-th delay, and $d_j$ is a real-valued coefficient representing a common amplitude for the combining coefficients for all beams associated with the j-th delay. Note that the calculation of the values $d_j$ is implementation specific.

3. Scheme 3

The third scheme decomposes the (i,j)-th combining-coefficient of matrix $W_2^{(r)}$ associated with the i-th beam and j-th delay into three coefficients, $a_j$ and $b_{i,j}$, $$[W_2^{(r)}]_{i,j} = a_i d_j b_{i,j},$$

where $b_{i,j}$ is the complex-valued normalized combining-coefficient associated with the i-th beam and j-th delay, $d_j$ is a real-valued coefficient representing a common amplitude for the combining coefficients for all beams associated with the j-th delay, and $a_i$ is a real-valued coefficient representing a common amplitude for the combining coefficients for all delays associated with the i-th beam. Note that the calculation of the values $a_i$ and $d_j$ are implementation specific.

The receiver may be configured to represent the combining coefficients or only a set of the combining coefficients in $W_2^{(r)}$ by scheme 1, scheme 2, or scheme 3. Note that the proposed schemes can also be combined for representing the combining coefficients. For example, the receive may be configured to represent a first set of combining coefficient of $W_2^{(r)}$ by scheme 1 or scheme 2, and a second set of the combining coefficients of $W_2^{(r)}$ by scheme 3.

4. Quantization of Coefficients $a_i, b_{i,j}$ and $d_j$

After the decomposition of each entry of $W_2^{(r)}$ into the coefficients $a_i$ and $b_{i,j}$, or $d_j$ and $b_{i,j}$, or $a_i$, $d_j$ and $b_{i,j}$, the coefficients are quantized separately in according with an embodiment. The main advantage of the above decomposition schemes is that the amplitude values of $b_{i,j}$ may be quantized with a significantly lower number of bits than the amplitude values of the combining-coefficients in $W_2^{(r)}$. Therefore, the feedback overhead for reporting the amplitude values of the entries in $W_2^{(r)}$ advantage be significantly reduced when applying one of the proposed decomposition schemes.

For example, the receiver may be configured to quantize the real-valued coefficients $a_i$ (and/or $d_j$) equally with $N_a$ (and/or $N_d$) bits. Each complex-valued coefficient $b_{i,j}$ may be quantized with $N_{b,1}$ and $N_{b,2}$ bits for the amplitude and phase, respectively, where $N_{b,1}$ may be lower than $N_{b,2}$.

Feedback Overhead Saving for Scheme 1:

For scheme 1, assuming there are UD combining coefficients contained in matrix $W_2^{(r)} \in \mathbb{C}^{U \times D}$, a total of $UN_a + UD$ $(N_{b,1} + N_{b,2})$ bits are required for reporting the amplitude and phase information of the coefficients $a_i$ and $b_{i,j}$. In contrast, when directly quantizing the entries of matrix $W_2^{(r)}$ with $N_a$ bits per amplitude and $N_a$ bits per phase, $2UDN_a$ bits are required for reporting the coefficients of $W_2^{(r)}$. Assuming that the phase values of $b_{i,j}$ are quantized equally with $N_{b,2} = N_a$ bits, the amount of feedback that may be saved by scheme 1 may be given by $U(D(N_a - N_{b,1}) - N_a)$ bits. For typical values for the number of beams (U), delays (D) and quantization bits $(N_a)$ of U=8, D=4, $N_a$=4, and $N_{b,1}$=2, a total of 32 bits may be saved for the amplitude and phase reporting compared to the direct quantization of the entries in $W_2^{(r)}$.

Feedback Overhead Saving for Scheme 2:

For scheme 2, assuming again there are UD combining coefficients contained in matrix $W_2^{(r)} \in \mathbb{C}^{U \times D}$, a total of $DN_d + UD(N_{b,1} + N_{b,2})$ bits are required for reporting the amplitude and phase information of the coefficients $d_j$ and $b_{i,j}$. Assuming that the phase values of $b_{i,j}$ are quantized equally with $N_{b,2} = N_d$ bits, the amount of feedback that may be saved by scheme 2 is given by $D(U(N_d - N_{b,1}) - N_d)$ bits. For typical values for the number of beams (U), delays (D) and quantization bits ($N_d$) of U=8, D=4, $N_d$=4, and $N_{b,1}$=2, a total of 48 bits maybe saved for the amplitude and phase reporting compared to the direct quantization of the entries in $W_2^{(r)}$.

Feedback Overhead Saving for Scheme 3:

For scheme 3, assuming again there are UD combining coefficients contained in matrix $W_2^{(r)} \in \mathbb{C}^{U \times D}$, a total of $UN_a + DN_d + UD(N_{b,1} + N_{b,2})$ bits are required for reporting the amplitude and phase information of the coefficients $a_i$, $d_j$ and $b_{i,j}$. Assuming that the real-valued coefficients $a_i$ and $d_j$ are equally quantized with $N_a = N_d$ bits and the phase values of $b_{i,j}$ are quantized with $N_{b,2} = N_a$ bits, the amount of feedback that may be saved by scheme 3 is given by $UD(N_a - N_{b,1}) - (U+D)N_a$ bits. For typical values for the number of beams (U), delays (D) and quantization bits ($N_a$) of U=8, D=4, $N_a$=4, and $N_{b,1}$=1, a total of 48 bits may be saved for the amplitude and phase information reporting compared to the direct quantization of the entries in $W_2^{(r)}$.

5. Selection and Reporting of Non-Zero Coefficients $b_{i,j}$ by Using a Bitmap

To reduce the overhead for reporting the coefficients in $W_2^{(r)}$, the UE may be configured to report only the phase values, only the amplitude values, or the amplitude and phase values of the quantized non-zero coefficients $b_{i,j}$. To indicate the indices of the quantized non-zero coefficients $b_{i,j}$, the receiver may be configured to report in addition to the amplitude and/or phase information a bitmap, where each bit in the bitmap is associated with a coefficient $b_{i,j}$. For example, the first bit may be associated with coefficient $b_{1,1}$, the second bit with coefficient $b_{1,2}$, etc. When a bit in the bitmap is set to one, the UE may report the phase and/or amplitude values of the associated coefficient $b_{i,j}$ to the gNB. The bitmap may hence contain P "1"s, where P corresponds to the number of non-zero coefficients $b_{i,j}$.

6. Selection and Reporting of K Strongest Coefficients $b_{i,j}$

To reduce the overhead for reporting the coefficients in $W_2^{(r)}$ and to fix the number of feedback bits for CSI reporting, the UE may be configured to report only the phase values, only the amplitude values, or the amplitude and phase values of the K strongest coefficients of matrix $W_2^{(r)}$, where the value of the parameter K is configurable by the gNB.

The K strongest coefficients may be represented by the K entries having the highest amplitude (or power) over the elements in $W_2^{(r)}$. To indicate the indices of the K strongest elements, the receiver may be configured to report in addition to the K amplitude and/or phase information a bitmap, where each bit in the bitmap is associated with a coefficient $b_{i,j}$. For example, the first bit may be associated with coefficient $b_{1,1}$, the second bit with coefficient $b_{1,2}$, etc. When a bit in the bitmap is set to one, the UE may report the phase and/or amplitude values of the associated coefficient $b_{i,j}$ to the gNB. The bitmap may hence contain K "1"s. In the case the number of non-zero amplitude values of the quantized matrix $W_2^{(r)}$ is less than K, the UE may report only the amplitude and/or phase information with respect to the non-zero coefficients of the quantized matrix $W_2^{(r)}$. The bitmap may then contain less than K "1"s.

The amount of feedback required for reporting the amplitude and phase information is given (for scheme 3) by $UN_a + DN_d + K(N_{b,1} + N_{b,2})$ bits for the amplitude and phase information of $W_2^{(r)}$ and UD bits for the bitmap. Hence, a total of $(UD-K)(N_{b,1} + N_{b,2}) - UD$ bits may be saved compared to the case of reporting the amplitude and phase information of all coefficients in $W_2^{(r)}$ to the gNB.

In order to increase the flexibility of selecting the coefficients and to improve the system performance, the receiver may be configured to select $K_u$ strongest coefficients per row/beam out of matrix $W_2^{(r)}$, where the parameters $K_u$ may be configurable by the gNB. Note that the values of $K_u$ may be identical for a set of rows/beams of matrix $W_2^{(r)}$. In such a case, a single parameter R may be used to configure multipole parameters $K_d$.

Similarly, the receiver may be configured to select $K_d$ strongest coefficients per column/delay out of matrix $W_2^{(r)}$, where the parameters $K_d$ may be configurable by the gNB. Note that the values of $K_d$ can also be identical for a set of columns/delays of matrix $W_2^{(r)}$. In such a case, a single parameter O is used to configure multiple parameters $K_d$.

Figure 3:
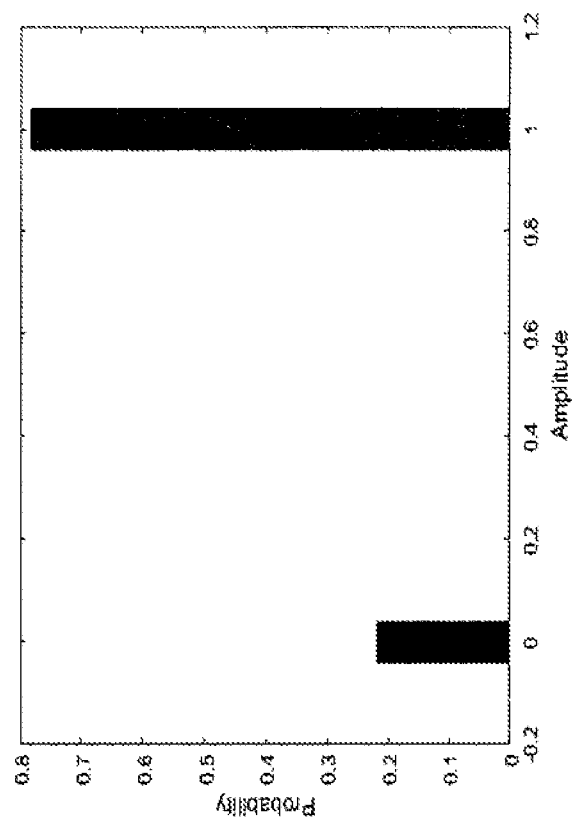
Figure 2:
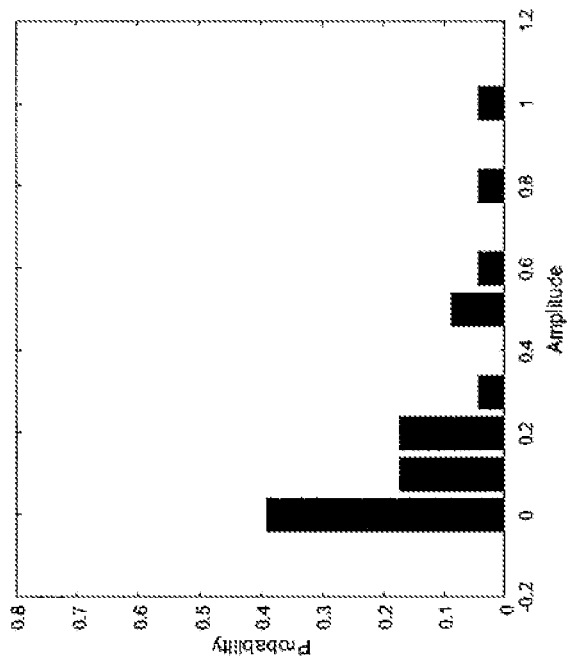
FIG. 2 illustrates amplitude distribution of the combining coefficients in matrix $W_2^{(r)}$ FIG. 3 Amplitude distribution of coefficients $b_{i,j}$ for scheme 3 according to an embodiment herein.

7. Reporting of Phase-Only Information of Matrix B without Bitmap Indication and 1-Bit Amplitude Quantization FIG. 2 and FIG. 3 show the amplitude distribution of the combining coefficients in matrix $W_2^{(r)}$ and the amplitude distribution of coefficients $b_{i,j}$ when applying the proposed third decomposition scheme according to previously described embodiment.

As shown, when applying the proposed third decomposition scheme, the coefficients $b_{i,j}$ may be efficiently represented by only two quantization levels in contrast to combining coefficients in matrix $W_2^{(r)}$. The amplitude information of the coefficients $b_{i,j}$ can therefore be quantized using only one bit for the amplitude values. The receiver may therefore to be configured with $N_{b,1}=1$ and each amplitude value may be represented by two quantization levels "a" and "b", where for example "a" and/or "b" are given by "a=0" and "b=1". The bits in the bitmap then directly correspond to the two quantization levels of the amplitude values of the coefficients $b_{i,j}$ and an additional report of the amplitude values of $b_{i,j}$ is not required. As $N_{b,1}=1$, the amount of feedback for reporting the phase values is drastically reduced as well, since a reporting of the phase values associated with zero amplitude coefficients is not required. The same quantization levels may also be used for scheme 1 and scheme 2 for quantizing coefficients $b_{i,j}$.

Note that the above also holds for scheme 1 and scheme 2, i.e. the receiver may be configured with $N_{b,1}=1$ each amplitude value may be represented by two quantization levels "a" and "b", where for example "a" and/or "b" are given by "a=0" and "b=1".

8. Different Quantization Levels for the Phase Values of $b_{i,j}$

To further reduce the overhead for reporting the phase information of the coefficients $b_{i,j}$, the receiver may be configured to apply different quantization levels for the phase values of the coefficients $b_{i,j}$. For example, the receiver may configured to use $N'_{b,2}$ bits for the phase values associated with the non-zero coefficients and the U' strongest beams and $N_{b,2}''$ bits for the phase values associated with the non-zero coefficients and the remaining beams, where $N_{b,2}' > N_{b,2}''$.

B. Reporting of the Indices Associated with the Selected DFT/DCT Vectors:

In addition to the reporting of quantized coefficients of matrix $W_2^{(r)}$, the following describes an approach for efficiently reporting the indices of the DFT/DCT vectors associated with the complex combining coefficients of matrix $K_F^{(r)}$ according with an exemplary embodiment herein. The DFT/DCT vectors are selected from a set of predefined DFT/DCT basis vectors, where each DFT/DCT basis vector is associated with an index. For example, when there are S DFT/DCT basis vectors, the first DFT/DCT basis vector is associated with a first index ("1"), the second DFT/DCT basis vector is associated with a second index ("1"), and the last DFT/DCT basis vector is associated with the index ("S"). When reporting D selected DFT/DCT basis vectors, $D \lfloor \log_2(S) \rfloor$ feedback bits are required.

Instead of directly reporting the indices of the DFT/DCT basis vectors, the receiver may be configured to report a bitmap, where each bit in the bitmap is associated with an index "d" from the set of basis vectors.

For example, the first bit may be associated with index 1, the second bit with index 2, etc. A "1" in a bitmap at position "d" indicates then the selection of the DFT/DCT vector associated with the index "d".

As an example, when the number of subbands S=13 and D=6, the amount of feedback required to report the indices of the selected DFT/DCT vectors is given by $D \lfloor \log_2(S) \rfloor = 24$, where in contrast only S=13 bits are required when using a bitmap.

According to an embodiment, when the reported bitmap is comprised of a "1" at position "1", then the amplitude and phase values of the leading beam must be considered as follows:

A "1" at position 1 of the bitmap indicates that the amplitude and phase of the combining coefficient of the leading beam associated with index "1" are given by 1 and 0, respectively, and are not reported. The amplitude and phase values of the remaining combining coefficients of the leading beam associated with other indices are given by 0 and 0, respectively, and are not reported. The amplitude and phase associated with the leading beam are known at the gNB.

As initially described, the proposed solutions are suitable for the 3GPP Rel-15 framework. Below is presented modifications (1)-(7) that are herein suggested by the inventors to the Rel. 15 framework according to some embodiments herein (1) The number of leading beams (B) for which the amplitude values of $b_{i,j}$ shall be reported to the gNB is given by B=2L or 2L−1 for the proposed CSI reporting using DFT/DCT transformation instead of B=4, 4, and 6 for L=2, 3, and 4 as in current Rel. 15, where L is the number of spatial beams configured.

(2) All quantized amplitude and phase values of $b_{i,j}$ associated with the first leading beam are not reported to the gNB.

(3) When $N_a=3$, the amplitude set for quantizing $a_i$ is given $$\{1, \sqrt{0.5}, \sqrt{0.25}, \sqrt{0.125}, \sqrt{0.0625}, \sqrt{0.0313}, \sqrt{0.0156}, 0\}$$

(4) When $N_d=3$, the amplitude set for quantizing $d_j$ is given uniform $$\{1, \sqrt{0.5}, \sqrt{0.25}, \sqrt{0.125}, \sqrt{0.0625}, \sqrt{0.0313}, \sqrt{0.0156}, 0\}$$

(5) When $N_d=2$, the amplitude set for quantizing $d_j$ is given $$\{1, \sqrt{0.5}, \sqrt{0.25}, 0\}$$

(6) The amplitude set for quantization of $b_{i,j}$ is given {0, 1}.

(7) The phase set for quantizing $b_{i,j}$ is given by a 8PSK, or 16PSK constellation.

It should be mentioned that differently to equation (3) above, one may introduce in the following a new transformation/decomposition of the U×S matrix $F_2^{(r)}$ that may be combined with the above mentioned three decomposition/quantization schemes. Compared to equation (3), the following transformation/decomposition reduces further the overhead of reporting the combining coefficients when combined with the above-mentioned three decomposition/quantization schemes. The frequency domain combining coefficient matrix $F_2^{(r)}$ is decomposed into three matrices, $$F_2^{(r)} = A^{(r)} \overline{F}_2^{(r)} B^{(r)},$$

where $A^{(r)}$ is a real-valued U×U diagonal matrix containing U "wideband" amplitude coefficients of the respective rows/beams of matrix $F_2^{(r)}$, $\overline{F}_2^{(r)}$ is a complex-valued U×S matrix containing US "subband" combining coefficients of the U beams and S subbands, and $B^{(r)}$ is a real-valued S×S diagonal matrix containing S values on its diagonal.

The matrix $A^{(r)}$ contains the values of the "average" amplitudes of the rows/beams of the combining coefficients of matrix $F_2^{(r)}$. The matrix $B^{(r)}$ is a normalization matrix that forces the S combining coefficients in the row of matrix $\overline{F}_2^{(r)}$ which are associated with the leading beam to be "1". Note that the leading beam is associated with the highest "wideband" amplitude coefficient of matrix $A^{(r)}$. By considering now a transformation on the subband coefficient matrix $\overline{F}_2^{(r)}$, the frequency domain combining coefficients $F_2^{(r)}$ may be written as, $$F_2^{(r)} = A^{(r)} \overline{W}_2^{(r)} C^{(r)} K_F^{(r)^T} B^{(r)},$$
$$= W_2^{(r)} K_F^{(r)^T} B^{(r)}$$

where $W_2^{(r)} = A^{(r)} \overline{W}_2^{(r)}$ with $\overline{W}_2^{(r)} \in \mathbb{C}^{L \times V}$ containing 2L×V complex-combining coefficients associated with the V basis vectors in matrix $K_F^{(r)} \in \mathbb{C}^{V \times S}$ (see equation (3)) and $C^{(r)}$ is a V×V diagonal matrix containing the "common" amplitude values of the V basis vectors.

The quantization and reporting of $W_2^{(r)}$ is as previously described

For Reporting of $B^{(r)}$ the receiver (or e.g. the UE) may be configured to report or not to report the S coefficients of the diagonal matrix $B^{(r)}$ using $N_B$ bits per coefficients. When the receiver is configured not to report the S coefficients, the transmitter (e.g. the gNB) assumes that the matrix $B^{(r)}$ is given by an identity matrix when reconstructing the pre-coder matrix. Note that the coefficients in matrix $B^{(r)}$ may be represented by only two quantization levels "a" and "b", where for example "a" and/or "b" are given by "$a=\sqrt{0.5}$" and "b=1".

It should be mentioned that all parameters and denoted values may take any suitable values and some or all are design parameters which when used achieve the technical effects and advantages of the embodiments described in this disclosure.

Figure 4:
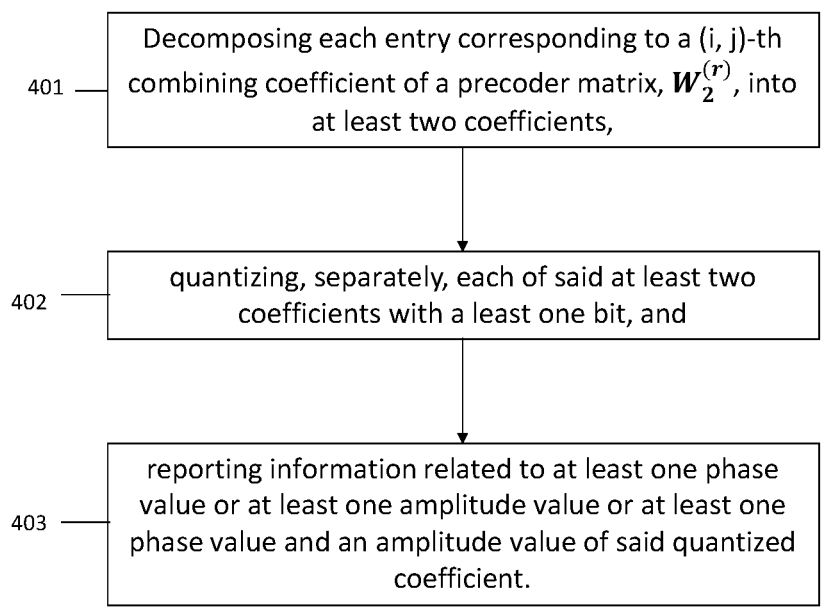
FIG. 4 illustrates a flowchart of a method performed by a UE according to some exemplary embodiments herein.

Referring to FIG. 4, there is illustrated a flowchart of a method performed by a UE 500 for reducing feedback overhead related to CSI in a communications network employing MIMO operation, the method comprises:

(401) decomposing each entry corresponding to a (i, j)-th combining coefficient of a precoder matrix, $W_2^{(r)}$, into at least two coefficients, wherein r denotes a r-th transmission layer; said (i, j)-th combining coefficient is associated with a i-th beam and a j-th delay, and wherein each combining coefficient is associated with an amplitude and a phase-information;

(402) quantizing, separately, each of said at least two coefficients with a least one bit, and (403) reporting information related to at least one phase value or at least one amplitude value or at least one phase value and an amplitude value of said quantized coefficient.

The method performed by the UE, according to some embodiments herein is presented in the subject-matter of each of the claims listed below.

Figure 5:
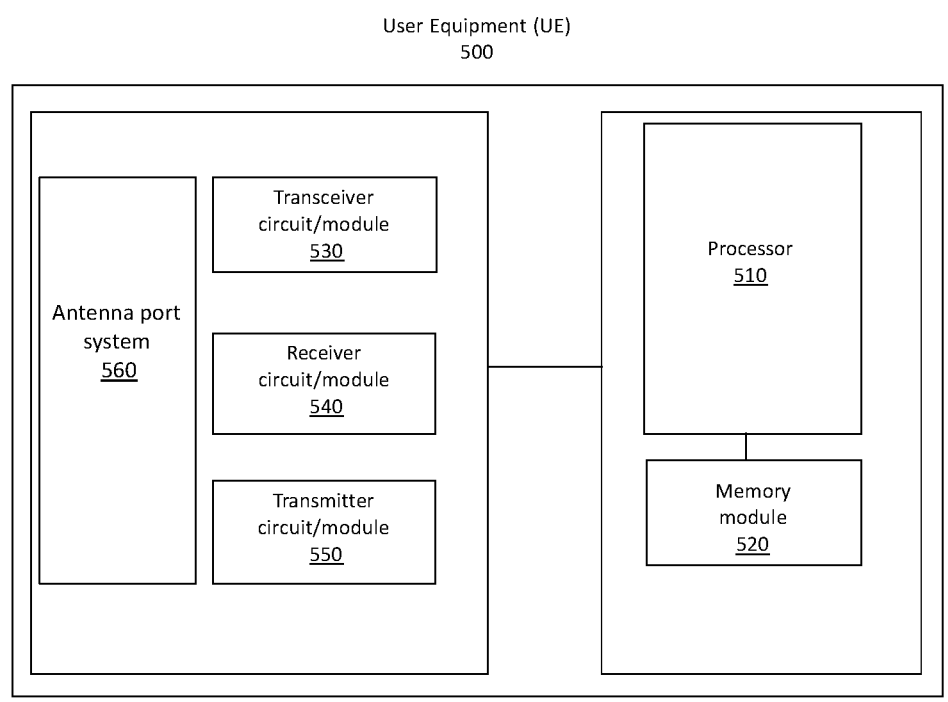
FIG. 5 is a block diagram depicting a UE according to exemplary embodiments herein.
Figure 6:
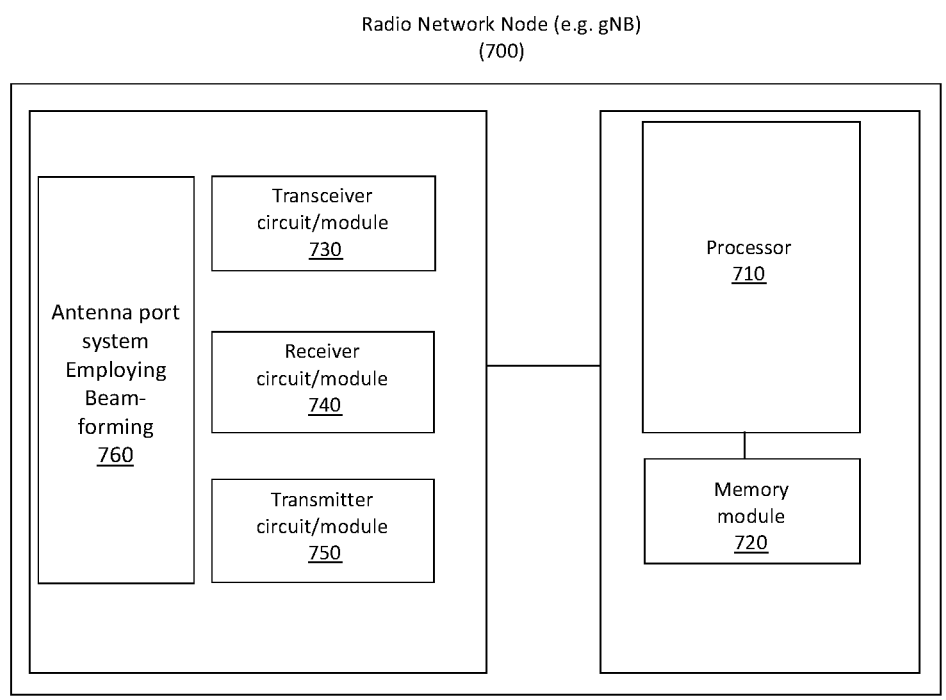
FIG. 6 is a block diagram depicting a radio network node according to exemplary embodiments herein.

In order to perform the previously described process or method steps related to the UE, embodiments herein include a UE for reducing feedback overhead in a communications network. As shown in FIG. 5, the UE 500 comprises a processor 510 or processing circuit or a processing module or a processor or means 510; a receiver circuit or receiver module 540; a transmitter circuit or transmitter module 550; a memory module 520 a transceiver circuit or transceiver module 530 which may include the transmitter circuit 550 and the receiver circuit 540. The UE 500 further comprises an antenna system 560 which includes antenna circuitry for transmitting and receiving signals to/from at least a radio network node or gNB. The antenna system may employ beamforming as previously described.

The UE 500 may operate in any radio access technology including 2G, 3G, 4G or LTE, LTE-A, 5G, WLAN, and WiMax etc. that support beamforming technology.

The processing module/circuit 510 includes a processor, microprocessor, an application specific integrated circuit (ASIC), field programmable gate array (FPGA), or the like, and may be referred to as the "processor 510." The processor 510 controls the operation of the network node 500 and its components. Memory (circuit or module) 520 includes a random access memory (RAM), a read only memory (ROM), and/or another type of memory to store data and instructions that may be used by processor 510. In general, it will be understood that the UE 500 in one or more embodiments includes fixed or programmed circuitry that is configured to carry out the operations in any of the embodiments disclosed herein.

In at least one such example, the UE 500 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including any one of the claims listed below. Further, it will be appreciated that the UE 500 may comprise additional components not shown in FIG. 5.

As previously presented, the UE 500 is operative to: decompose each entry corresponding to a (i, j)-th combining coefficient of a precoder matrix $W_2^{(r)}$, into at least two coefficients, wherein r denotes a r-th transmission layer; said (i, j)-th combining coefficient is associated with a i-th beam and a j-th delay, and wherein each combining coefficient is associated with an amplitude and a phase-information; quantize, separately, each of said at least two coefficients with a least one bit, and reporting information related to at least one phase value or at least one amplitude value or at least one phase value and an amplitude value of said quantized coefficient.

The UE is configured to decompose using a first scheme, the (i,j)-th combining-coefficient of said matrix $W_2^{(r)}$ associated with the i-th beam and j-th delay into two coefficients, $a_i$ and $b_{i,j}$, $$[W_2^{(r)}]_{i,j} = a_i b_{i,j},$$

where $b_{i,j}$ is complex-valued normalized combining-coefficient associated with the i-th beam and j-th delay, and $a_i$ is a real-valued coefficient representing a common amplitude for the combining coefficients for all delays associated with the i-th beam.

The UE 500 is configured to decompose using a second scheme, the (i,j)-th combining-coefficient of matrix $W_2^{(r)}$ associated with the i-th beam and j-th delay into two coefficients, $d_j$ and $b_{i,j}$, $$[W_2^{(r)}]_{i,j} = d_j b_{i,j},$$

where $b_{i,j}$ is the complex-valued normalized combining-coefficient associated with the i-th beam and j-th delay, and $d_j$ is a real-valued coefficient representing a common amplitude for the combining coefficients for all beams associated with the j-th delay.

The UE 500 is configured to decompose, using a third scheme the (i,j)-th combining-coefficient of matrix $W_2^{(r)}$ associated with the i-th beam and j-th delay into three coefficients, $a_j$, $d_j$ and $b_{i,j}$.

$$[W_2^{(r)}]_{i,j} = a_i d_j b_{i,j},$$

where $b_{i,j}$ is the complex-valued normalized combining-coefficient associated with the i-th beam and j-th delay, $d_j$ is a real-valued coefficient representing a common amplitude for the combining coefficients for all beams associated with the j-th delay, and $a_i$ is a real-valued coefficient representing a common amplitude for the combining coefficients for all delays associated with the i-th beam.

The UE 500 is configured to represent the combining coefficients or only a set of the combining coefficients in $W_2^{(r)}$ by the first scheme, the second scheme, or the third scheme.

Additional details relating to the functionality or actions performed by the UE have already been disclosed (see method steps performed by the UE).

There is also provided a computer program comprising instructions which when executed on at least one processor 510 of the UE, cause the processor 510 to carry out the method according to any one of the claims listed below.

There is also provided a method performed by a radio base station or a radio network node or a gNB 700 according to some exemplary embodiments:

The method for reducing feedback overhead related to CSI in the communications network employing MIMO operation comprises:

(601) receiving, from a UE 500 a report including information related to at least one phase value or at least one amplitude value or at least one phase value and an amplitude value each quantized coefficient which is quantized with a least one bit by a UE 500; wherein each entry corresponding to a (i, j)-th combining coefficient of a precoder matrix $W_2^{(r)}$, is decomposed by the UE 500 into at least two coefficients, wherein r denotes a r-th transmission layer; said (i, j)-th combining coefficient is associated with a i-th beam and a j-th delay, and wherein each combining coefficient is associated with an amplitude and a phase-information;

The method comprises configuring the UE to feedback the amplitude and/or phase values of K strongest coefficients of matrix $W_2^{(r)}$, wherein the value of K is configurable by radio network node (700) or the gNB.

The method comprises configuring the UE comprises configuring the UE to select $K_u$ strongest coefficients per row/beam out of matrix $W_2^{(r)}$, where the parameters $K_u$ is configurable by the radio base station or gNB.

The method comprises configuring the UE to select $K_d$ strongest coefficients per column/delay out of matrix $W_2^{(r)}$, where the parameters $K_d$ is configurable by the radio base station (700) or gNB.

The method comprises configuring the UE to report only the amplitude and/or phase information for a subset of the coefficients in $W_2^{(r)}$.

The method comprises configuring the UE to represent the combining coefficients or only a set of the combining coefficients in $W_2^{(r)}$ by the first scheme or the second scheme or the third scheme.

The method comprises configuring the UE to quantize the real-valued coefficients $a_i$ (and/or $d_j$) equally with $N_a$ (and/or $N_a$) bits, wherein $a_i$ is a real-valued coefficient representing a common amplitude for the combining coefficients for all delays associated with the i-th beam.

The method comprises configuring the UE comprises configuring the UE to report only the phase values, only the amplitude values, or the amplitude and phase values of the quantized non-zero coefficients $b_{i,j}$.

The method comprises configuring the UE configuring the UE to report a bitmap, where each bit in the bitmap is associated with an index "d" from a set of DFT/DCT basis vectors.

Additional functions performed by the radio network node 700 has already been disclosed and need no repetition.

In order to perform the previously described process or method steps related to the radio network node, some embodiments herein include a radio network node 700 for reducing feedback overhead in a communications network.

As shown in FIG. 7, the radio network node 700 comprises a processor 710 or processing circuit or a processing module or a processor or means 710; a receiver circuit or receiver module 740; a transmitter circuit or transmitter module 770; a memory module 720 a transceiver circuit or transceiver module 730 which may include the transmitter circuit 770 and the receiver circuit 740. The radio network node 700 further comprises an antenna system 760 which includes antenna circuitry for transmitting and receiving signals to/from at least network nodes and other UEs etc. The antenna system employs beamforming as previously described.

The radio network node 700 may operate in any radio access technology including 2G, 3G, 4G or LTE, LTE-A, 5G, WLAN, and WiMax etc. that support beamforming technology.

The processing module/circuit 710 includes a processor, microprocessor, an application specific integrated circuit (ASIC), field programmable gate array (FPGA), or the like, and may be referred to as the "processor 710." The processor 710 controls the operation of the UE 700 and its components. Memory (circuit or module) 720 includes a random access memory (RAM), a read only memory (ROM), and/or another type of memory to store data and instructions that may be used by processor 710. In general, it will be understood that the radio network node 700 in one or more embodiments includes fixed or programmed circuitry that is configured to carry out the operations in any of the embodiments disclosed herein.

In at least one such example, the radio network node 700 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out any the operations disclosed herein. Further, it will be appreciated that the radio network node 700 may comprise additional components not shown in FIG. 7. For reducing feedback overhead related to Channel State Information, CSI, in a communications network employing Multi Input Multi Output, MIMO operation, the gNB is operative to perform any one of the claims listed below.

Additional functions performed by the radio network node 700 have already been disclosed and need not be repeated again.

There is also provided a computer program comprising instructions which when executed on at least one processor 710 of the radio network node 700, cause the at least said one processor 710 to carry out the method according to any of the claims listed below.

A carrier containing the computer program is also provided, wherein the carrier is one of a computer readable storage medium; an electronic signal, optical signal or a radio signal.

As evident from the detailed description presented above, several advantages are achieved by the disclosed embodiments.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc. that may employ beamforming technology.

REFERENCES

[1] Samsung, "Revised WID: Enhancements on MIMO for NR", RP-182067, 3GPP RAN #81, Gold Coast, Australia, Sep. 10-13, 2018.
[2] Fraunhofer IIS, Fraunhofer HHI, "Enhancements on Type II CSI reporting scheme," R1-1806124, Busan, South Korea, May 21-25, 2018.
[3] Fraunhofer IIS, Fraunhofer HHI, "Enhancements on Type-II CSI reporting," R1-1811088, Chengdu, China, Oct. 8-12, 2018.
[4] Fraunhofer IIS, Fraunhofer HHI, "Space-delay versus sub-band precoding for mmWave channels," R1-1800597, Vancouver, Canada, Jan. 22-26, 2018.
Ericsson, "On CSI enhancements for MU-MIMO support," R1-1811193, Chengdu, China, Oct. 8-12, 2018.
[6] Huawei, HiSilicon, "Discussion on CSI enhancement for MU-MIMO," R1-1810103, Chengdu, China, Oct. 8-12, 2018.

[7] Fraunhofer IIS, Fraunhofer HHI, "Enhancements on Type II CSI reporting scheme," R1-1813130, Spokane, USA, Nov. 12-16, 2018.
[8] 3GPP TS 38.214 V15.3.0, "3GPP; TSG RAN; NR; Physical layer procedures for data (Release 15)", September 2018.
[9] Nokia, Nokia Shanghai Bell, "CSI feedback overhead reduction for MU-MIMO enhancements," R1-1813488, Nov. 12-16, 2018.

The invention claimed is:

1. A method comprising:
decomposing each (i,j)-th combining coefficient of a precoder matrix $W_2^{(r)}$ into at least two coefficients,
wherein r denotes a r-th transmission layer,
wherein the (i,j)-th combining coefficient is associated with a i-th beam and a j-th delay,
wherein each combining coefficient is associated with an amplitude and a phase-information,
wherein the decomposed (i,j)-th combining-coefficient of the matrix $W_2^{(r)}$ is given by:

$$[W_2^{(r)}]_{i,j} = a_i b_i,$$

wherein $b_{i,j}$ is a complex-valued normalized combining coefficient associated with the i-th beam and j-th delay,
wherein $a_i$ is a real-valued coefficient representing a common amplitude for the combining coefficients for all delays associated with the i-th beam;
quantizing each of the at least two coefficients with at least one bit; and
reporting the amplitude and phase values of quantized non-zero coefficients $b_{i,j}$.

2. The method according to claim 1, further comprising reporting the indices of the quantized non-zero coefficients $b_{i,j}$ in a bitmap, wherein each bit of the bitmap is associated with one coefficient $b_{i,j}$.

3. The method according to claim 1, further comprising:
quantizing each of the $a_i$ with $N_a$ bits; and
quantizing each of the $b_{i,j}$ with $N_{b,1}$ bits for the amplitude and $N_{b,2}$ bits for the phase,
wherein $N_{b,1}$ is less than $N_{b,2}$.

4. The method according to claim 3, further comprising representing each amplitude value by two quantization levels "a" and "b", wherein $N_{b,1}=1$.

5. The method according to claim 1, further comprising:
quantizing the entries of matrix $W_2^{(r)}$ with $N_a$ bits per amplitude and $N_a$ bits per phase; and
using $2UDN_a$ bits for reporting the coefficients of $W_2^{(r)}$, wherein UD is the number of combining coefficients.

6. The method according to claim 5 wherein when $N_a=3$, the amplitude set for quantizing $a_i$ is selected from the group consisting of $$\{1, \sqrt{0.5}, \sqrt{0.25}, \sqrt{0.125}, \sqrt{0.0625}, \sqrt{0.0313}, \sqrt{0.0156}, 0\}.$$

7. The method according to claim 1, further comprising applying different quantization levels for the phase values of the quantized non-zero coefficients $b_{i,j}$.

8. The method according to claim 7, further comprising using $N_{b,2}'$ bits for the phase values associated with non-zero coefficients $b_{i,j}$ and the U' strongest beams and $N_{b,2}''$ bits for the phase values associated with the non-zero coefficients $b_{i,j}$ and the remaining beams, wherein $N_{b,2}' > N_{b,2}''$.

9. The method according to claim 1, further comprising reporting indices of Discrete Fourier Transform/Discrete Cosine Transform, vectors associated with the complex combining coefficients of a matrix $K_F^{(r)}$.

10. The method according to claim 9, further comprising selecting the Discrete Fourier Transform/Discrete Cosine Transform vectors from a group of predefined Discrete Fourier Transform/Discrete Cosine Transform basis vectors, wherein each Discrete Fourier Transform/Discrete Cosine Transform basis vector is associated with an index.

11. The method according to claim 10, further comprising reporting a bitmap, wherein each bit in the bitmap is associated with an index "d" from the group of Discrete Fourier Transform/Discrete Cosine Transform basis vectors associated with the complex combining coefficients of matrix $K_F^{(r)}$.

12. The method according to claim 1,
wherein a number of leading beams is B,
wherein a number of spatial beams configured is L,
wherein the leading beams for which the amplitude values of $b_{i,j}$ shall be reported is given by B=2L or 2L−1,
wherein the reporting uses a Discrete Fourier Transform/Discrete Cosine Transform transformation.

13. The method according to claim 1, wherein the amplitude set for quantization of $b_{i,j}$ is selected from the group consisting of {0, 1}.

14. The method according to claim 1, wherein the phase set for quantizing $b_{i,j}$ is selected from the group consisting of 8PSK, Phase Shift Keying or constellation or a 16PSK constellation.

15. The method according claim 1, further comprising:
reporting the phase and amplitude values associated with the coefficient $b_{i,j}$ when a bit in bitmap is set to one; and
reporting the bitmap, wherein each bit in the bitmap is associated with each of the $b_{i,j}$.

16. The method according to claim 15, wherein the bitmap comprises K or less than K "1"s.

17. The method according to claim 15, further comprising reporting the amplitude and phase information with respect to the non-zero coefficients of the quantized matrix $W_2^{(r)}$ when the number of non-zero amplitude values of the quantized matrix $W_2^{(r)}$ is less than K.

18. A method comprising:
decomposing each (i,j)-th combining coefficient of a precoder matrix $W_2^{(r)}$ into at least two coefficients,
wherein r denotes a r-th transmission layer,
wherein the (i, j)-th combining coefficient is associated with a i-th beam and a j-th delay,
wherein each combining coefficient is associated with an amplitude and a phase-information,
wherein the decomposed (i, j)-th combining-coefficient of the matrix $W_2^{(r)}$ is given by:

$$[W_2^{(r)}]_{i,j} = a_i b_{i,j},$$

wherein $b_{i,j}$ is a complex-valued normalized combining coefficient associated with the i-th beam and j-th delay,
wherein $a_i$ is a real-valued coefficient representing a common amplitude for the combining coefficients for all delays associated with the i-th beam;
quantizing each of the at least two coefficients with at least one bit; and
reporting information from the coefficients in $W_2^{(r)}$, wherein the information comprises only phase values or only amplitude values.

19. The method according to claim 18, further comprising reporting the amplitude and phase values of K strongest coefficients of matrix $W_2^{(r)}$, wherein the value of the parameter K is configurable.

20. The method according to claim 19, further comprising selecting $K_u$ strongest coefficients per row/beam out of matrix $W_2^{(r)}$, wherein the $K_u$ is configurable.

21. The method according to claim 19, further comprising selecting $K_d$ strongest coefficients per column/delay out of matrix $W_2^{(r)}$, wherein the $K_d$ is configurable.

22. The method according to claim 18, further comprising reporting indices of Discrete Fourier Transform/Discrete Cosine Transform, vectors associated with the complex combining coefficients of a matrix $K_F^{(r)}$.

23. The method according to claim 22, further comprising selecting the Discrete Fourier Transform/Discrete Cosine Transform vectors from a group of predefined Discrete Fourier Transform/Discrete Cosine Transform basis vectors, wherein each Discrete Fourier Transform/Discrete Cosine Transform basis vector is associated with an index.

24. The method according to claim 22 comprises when the bitmap consists of a "1" at position "1", then the amplitude and phase values of the leading beam are considered as follows:
- A "1" at position 1 of the bitmap indicates that the amplitude and phase of the combining coefficient of the leading beam associated with index "1" are given by 1 and 0, respectively, and are not reported; and
- the amplitude and the phase of the remaining combining coefficients of the leading beam associated with other indices are given by 0 and 0, respectively, and are not reported.

25. The method according to claim 18, further comprising comprises not reporting the quantized amplitude and phase values of $b_{i,j}$ associated with the first leading beam.

* * * * *